(12) United States Patent
Theobald et al.

(10) Patent No.: US 8,739,820 B1
(45) Date of Patent: Jun. 3, 2014

(54) PRESSURE RELIEF VALVE

(75) Inventors: Daniel Theobald, Sommerville, MA (US); Michael Kokko, Arlington, MA (US)

(73) Assignee: Vecna Technologies, Inc., Cambridge, MA (US)

( * ) Notice: Subject to any disclaimer, the term of this patent is extended or adjusted under 35 U.S.C. 154(b) by 211 days.

(21) Appl. No.: 12/729,456

(22) Filed: Mar. 23, 2010

(51) Int. Cl.
*F16K 15/00* (2006.01)
*F16K 17/00* (2006.01)
*F16K 21/04* (2006.01)

(52) U.S. Cl.
USPC ...... 137/538; 137/524; 137/543.15; 137/540; 251/82

(58) Field of Classification Search
USPC ............... 137/524, 543.15, 540, 538; 251/82
See application file for complete search history.

(56) References Cited

U.S. PATENT DOCUMENTS

| | | | | |
|---|---|---|---|---|
| 1,735,117 A | * | 11/1929 | Kiger et al. | 137/538 |
| 2,005,813 A | * | 6/1935 | Thorsen | 137/494 |
| 2,668,555 A | * | 2/1954 | Bartolat | 137/498 |
| 2,683,464 A | * | 7/1954 | St Clair | 137/540 |
| 2,886,058 A | * | 5/1959 | Horton | 137/484.2 |
| 3,006,364 A | * | 10/1961 | Osborn | 137/538 |
| 3,145,732 A | * | 8/1964 | Joles | 137/514.3 |
| 3,537,518 A | * | 11/1970 | Sullivan et al. | 166/64 |
| 4,171,712 A | * | 10/1979 | DeForrest | 137/513.5 |
| 4,428,398 A | * | 1/1984 | Mito et al. | 137/530 |
| 4,860,856 A | * | 8/1989 | Esslinger | 184/6.4 |
| 4,921,393 A | * | 5/1990 | Andeen et al. | 414/729 |
| 5,011,043 A | * | 4/1991 | Whigham et al. | 222/63 |
| 5,018,547 A | * | 5/1991 | Alcorn | 137/111 |
| 5,779,446 A | * | 7/1998 | Althof et al. | 416/36 |
| 5,983,936 A | * | 11/1999 | Schwieterman et al. | 137/615 |
| 6,044,849 A | * | 4/2000 | Cewers et al. | 137/543.17 |
| 2006/0249625 A1 | * | 11/2006 | Matos | 244/118.5 |

* cited by examiner

*Primary Examiner* — John K Fristoe, Jr.
*Assistant Examiner* — David Colon Morales
(74) *Attorney, Agent, or Firm* — Albert J. Brunett

(57) ABSTRACT

A system, method and apparatus for enabling the release of pressure in a supply line including an electronic control member for controlling and enabling the release of pressure in the supply line at a desired pressure whether or not power is maintained to the electronic control member.

4 Claims, 2 Drawing Sheets

PRESSURE RELIEF VALVE

BACKGROUND OF THE INVENTION

The present invention relates generally to pressure relief valves and more particularly to electronically controlled pressure relief valves.

SUMMARY OF THE INVENTION

A system, method and apparatus for enabling the release of pressure in a supply line including an electronic control member for controlling and enabling the release of pressure in the supply line at a desired pressure whether or not power is maintained to the electronic control member.

DESCRIPTION OF THE DRAWINGS

The following detailed description will be better understood when read in conjunction with the appended drawings, in which there is shown one or more of the multiple embodiments of the present disclosure. It should be understood, however, that the various embodiments of the present disclosure are not limited to the precise arrangements and instrumentalities show in the drawings.

DESCRIPTION OF THE PREFERRED EMBODIMENTS

The present invention will be described in detail with reference to embodiments that represent examples of the present invention and are not intended to limit the scope of the invention. Although specific elements and configurations are described to provide an understanding of the invention, it is to be understood that the specific embodiments, elements and configurations provided are for illustrative purposes only. Other configurations will be recognized by those of ordinary skill in the art without departing from the teachings of the present invention or the scope of the appended claims.

Figure 1:
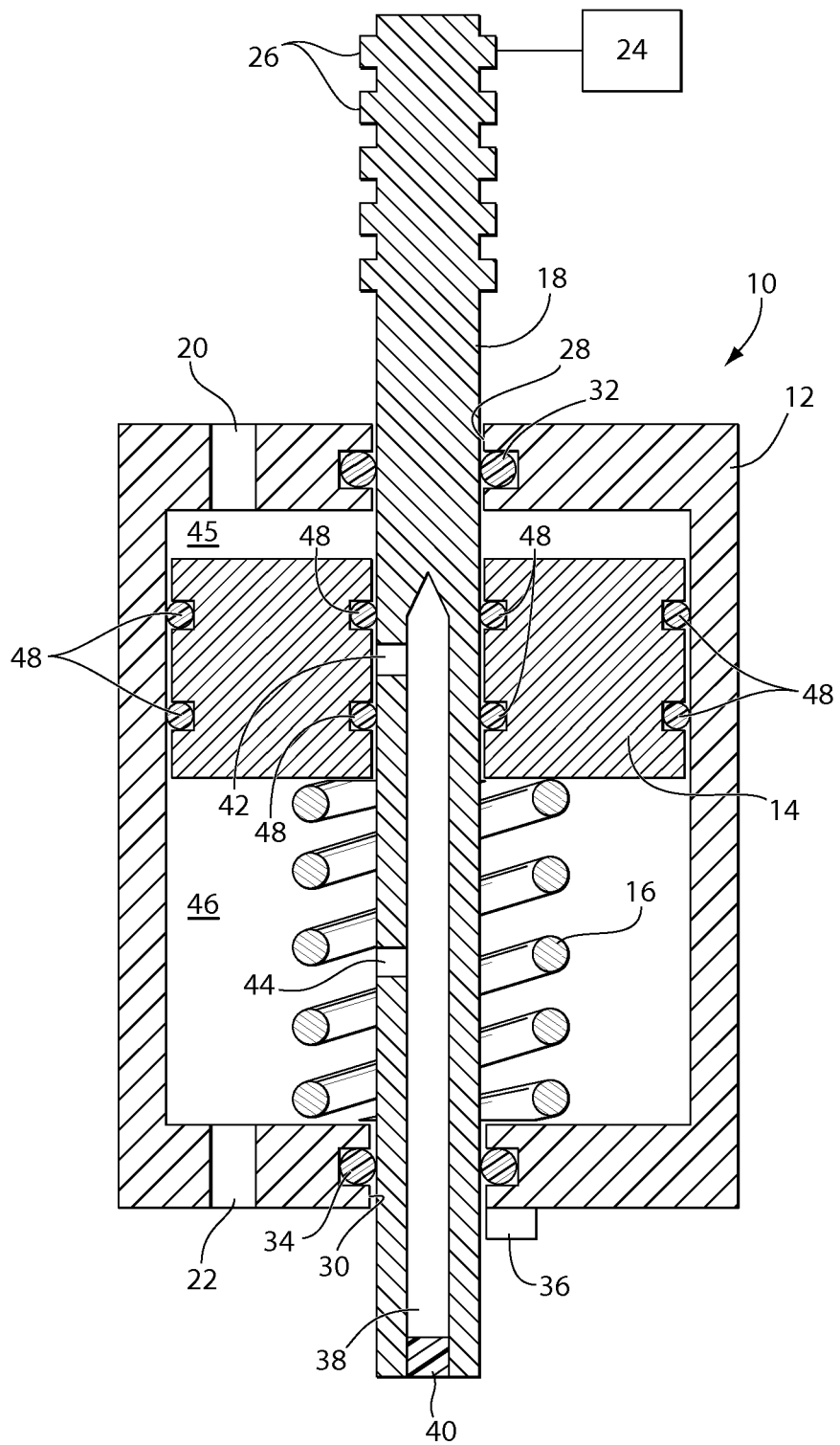
FIG. 1 is a longitudinal cross-sectional view of one embodiment of the present invention generally illustrating the pressure relief valve in a state where the system pressure is below the desired relief pressure.

As FIG. 1 generally illustrates, one embodiment of the pressure relief valve of the present invention is generally illustrated with the reference numeral 10. The valve 10 substantially includes a valve housing or body portion 12, a rodless piston member 14, a spring 16, a relief rod member 18, a supply or entry port 20 and a return or exit port 22.

Figure 2:
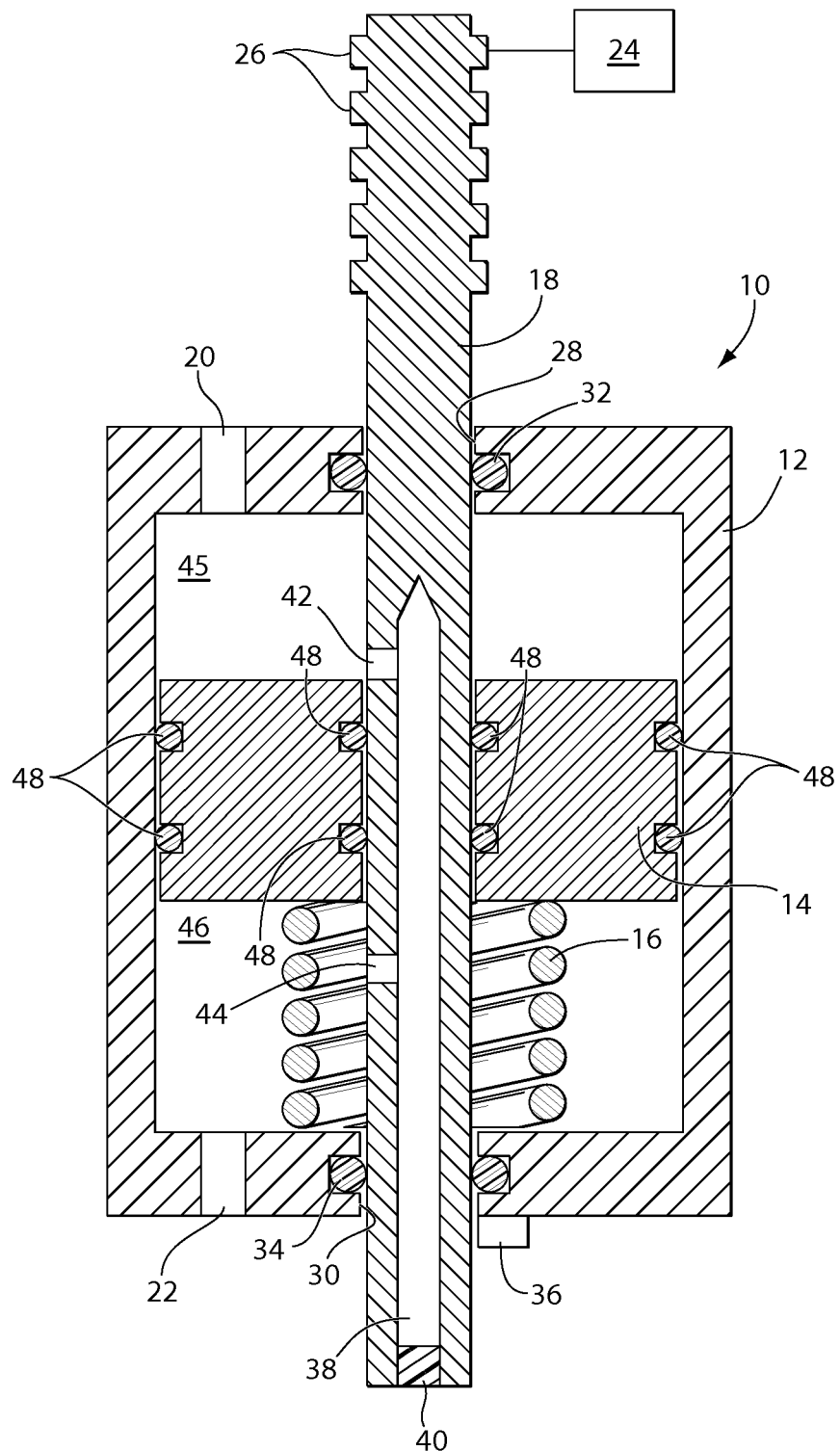
FIG. 2 is a longitudinal cross-sectional view of one embodiment of the present invention similar to FIG. 1 generally illustrating the pressure relief valve in another state where the system pressure exceeds the desired relief pressure.

Briefly, in use, the piston 14 of the valve 10 moves from a first closed state illustrated in FIG. 1 to a second open state illustrated in FIG. 2 upon achieving a desired pressure from the supply port 20. It is to be noted that in both FIGS. 1 and 2 the relief rod 18 is maintained in substantially the same position while the piston 14 is pressed against the spring 16 to open the valve as described in more detail below.

Pressure to the valve 10 can be provided by a fluid, such as a hydraulic fluid, or any other type of liquid or gas and typically is delivered to the valve 10 from a supply line to be relieved or another device under pressure (not illustrated). It is to be understood, however, that the valve 10 can be utilized in a variety of environments and with any desired substance under pressure and with any desired supply line or device without departing from the teachings of the present invention.

As can be readily understood, the combination of the position of the piston 14, spring constant of the spring 16 and the position of the relief rod 18 determines the pressure at which the valve 10 releases pressure via exit or return port 22. More particularly, with a given spring constant for the spring 16 the position of the relief rod 18 essentially determines the release pressure according to the teachings of the present invention.

In one embodiment of the present invention the position of the relief rod 18 is determined by a computer controlled device or assembly generally illustrated with the reference numeral 24 that is in operable communication with the relief rod 18. The device 24 can be any type of device so long as it functions as described herein and preferable is some type of device that is non-backdrivable so that the position of the relief rod 18 is maintained in the event power (not illustrated) to the device 24 is not maintained.

In one embodiment of the present invention the device 24 is a worm gear (not illustrated) in operable communication with threads 26 on the relief rod 18. The worm gear in turn is connected to an electric motor (not illustrated), for example, that is controlled by a computer or the like (not illustrated) to determine the position of the relief rod 18.

The housing 12 can take a variety of shapes and generally includes two apertures 28 and 30 positioned on either end of the housing 12 to accommodate the relief rod 18. The apertures 28 and 30 preferably include seals 32 and 34, respectively, to seal the housing 12 against the relief rod 18 while enabling sliding engagement of the relief rod 18 through the housing 12.

To determine the position of relief rod 18, a displacement sensor 36 can be included on the housing 12. The sensor 36 preferably is an electronic sensor, but the type as well as the position of the sensor 36 can vary so long as it functions as desired to determine the position of the relief rod 18.

The relief rod 18 is generally an elongate member having a central chamber 38 closed at one end by a plug 40. The particular size and shape of the central chamber 38 and plug 40 can vary.

The central chamber 38 preferably includes first and second ports 42 and 44 in communication with a supply side interior chamber 45 and a return side interior chamber 46, respectively, of the housing 12. The first and second ports 42 and 44 enable a fluid or gas under pressure from the supply port 20 to exhaust through the return port 22 via the central chamber 38 as illustrated in FIG. 2 when the piston 14 is moved against the spring 16 by means of the desired pressure achieved via the supply port 20.

The piston 14 typically includes a number of seals 48 for sealing against the relief rod 18 and interior surface of the housing 12. The number and types of seals 48 can vary so long as they function as desired.

One of many important features of the valve 10 is its adjustability independence from the pressure in the chamber 45 as well as the force of the spring 16. More specifically, the relief rod 18 can be moved within the housing 12 and through the piston 14 with substantially the same force regardless of the type of spring 16 or whether the pressure in the chamber 45 is high or low since merely the resistance of the seals 32, 34 and 48 need to be overcome, which typically is quite minimal.

This feature enables operation of the valve 10 with a minimum amount of power. When an electric motor, for example, is used as described above a much smaller motor can be used than would be required to pre-load a spring as in typical relief valve implementations. A smaller motor consumes less power and contributes to a potentially more miniature design for use in a variety of new applications where such valves 10 have not been utilized before, including mobile robotics and similar applications as described in more detail below.

The particular design of the valve 10 provides a compact and efficient mechanism that has few working parts but a full range of adjustability. The valve 10 can be a relatively miniature design for use in a variety of applications, although the particular size, shape and materials of the valve 10 can vary.

An important feature of the valve 10 of the present invention is its ability to be set and monitored by a computer yet will maintain the release pressure in the event power is interrupted to the computer or other electronics. This is critical in many applications that not only may be susceptible to power outages or spikes but in applications that may want to conserve power.

Although there exists a number of applications where power conservation is critical, an increasingly important area is mobile robotics. In such applications, conserving power enables longer robot running time which is an important and desirable feature.

Yet another important feature of an embodiment of the present invention is that the piston and spring, among other elements, can be designed to have very low mass. In such a situation, the low mass of at least the piston and spring provide for an extremely rapid response to changing pressure.

This is particularly important in relieving a potential pressure spike which typically needs to be released quickly to allow the system to return to its normal operating state, for example. In general, the lower the mass, the faster the piston and spring can accelerate when the pressure spikes and the faster the pressure will be relieved. It is to be understood that the particular mass of the piston, spring and indeed the valve itself as well as the particular pressure can vary and include miniature components having very minimal dimensions so long as they function as described and claimed herein.

The embodiments of the present disclosure may be implemented with any combination of hardware and software. If implemented as a computer-implemented apparatus, the embodiments of the present disclosure are implemented using means for performing all of the steps and functions described above.

The embodiments of the present disclosure can be included in an article of manufacture (e.g., one or more computer program products) having, for instance, computer useable media. The media has embodied therein, for example, computer readable program code means for providing and facilitating the mechanisms of the embodiments of the present disclosure. The article of manufacture can be included as part of a computer system or sold separately.

Although the description above contains many specific examples, these should not be construed as limiting the scope of the embodiments of the present disclosure but as merely providing illustrations of some of the presently preferred embodiments of this disclosure. Thus, the scope of the embodiments of the disclosure should be determined by the appended claims and their legal equivalents, rather than by the examples given.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the embodiments of the present disclosure.

We claim:

1. A mechanism for the relief of pressure within a supply line, comprising:
    a housing member;
    a first movable member in operable communication with the housing member;
    an electronic control member for controlling and enabling the release of pressure in the supply line at a desired pressure whether or not power is maintained to the electronic control member; and
    a relief rod including a substantially central chamber including at least two ports in operable communication with the first movable member, the electronic control member capable of adjusting the relief rod with respect to the housing and the first movable member to enable repositioning of the ports and the release of pressure via the ports and the substantially central chamber at a desired pressure whether or not power is maintained to the electronic control member.

2. The mechanism as defined in claim 1, wherein the electronic control member operates independent of pressure existing in the mechanism.

3. The mechanism as defined in claim 2, wherein the pressure existing in the mechanism includes supply line pressure.

4. The mechanism as defined in claim 2, wherein the pressure existing in the system includes any mechanical pressure within the mechanism.

* * * * *